March 18, 1930.  R. E. BOUTET  1,751,303
AUTOMATIC CHANGE GEAR MECHANISM
Filed Dec. 30, 1929
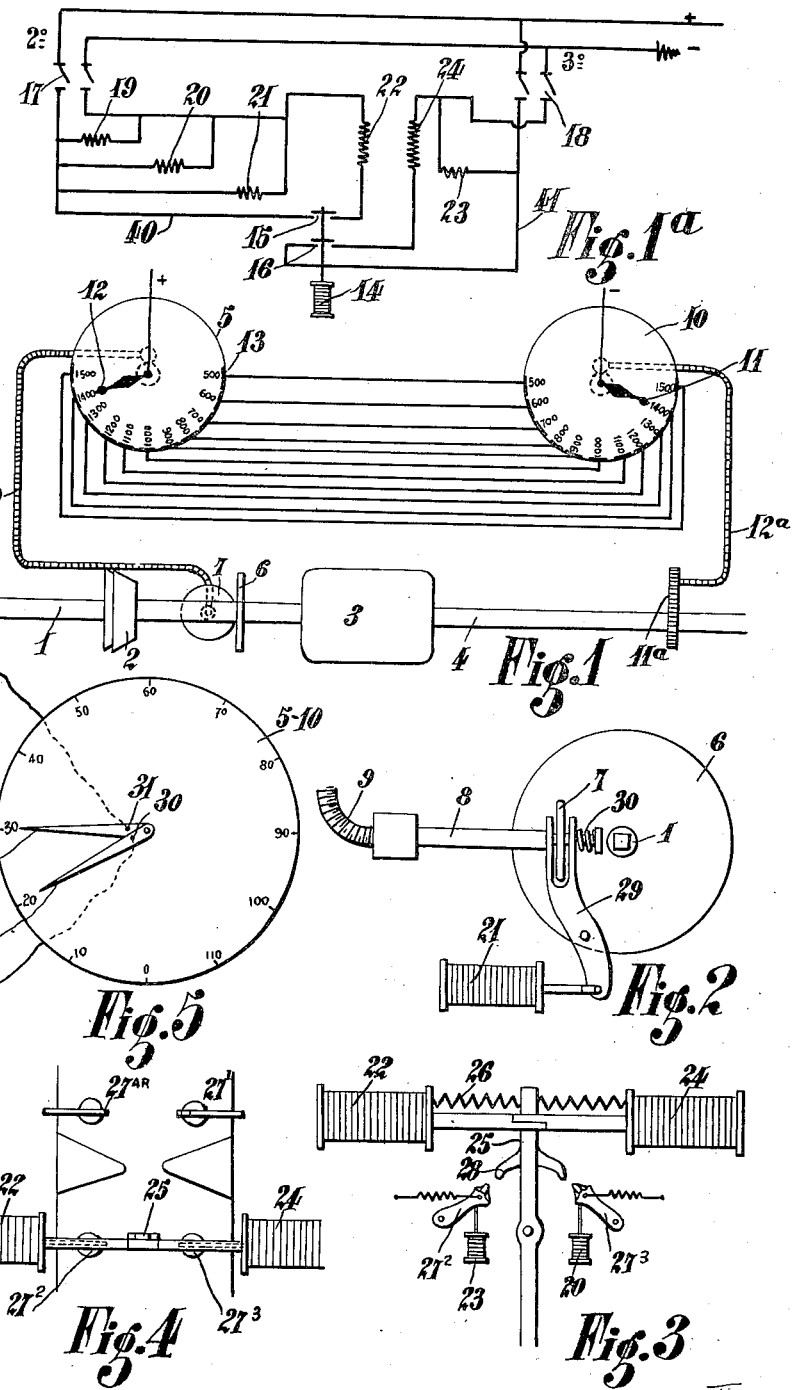

Patented Mar. 18, 1930

1,751,303

UNITED STATES PATENT OFFICE

RENÉ EDMOND BOUTET, OF PARIS, FRANCE

AUTOMATIC CHANGE-GEAR MECHANISM

Application filed December 30, 1929, Serial No. 417,461, and in France January 2, 1929.

The present invention relates to an automatic device for actuating change speed gears more particularly in automobile vehicles. With this device it is possible to pass automatically from one speed to another at the very moment when the pinions of the gear box rotate at speeds the ratio of which is equal to the ratio of the speeds at which they will rotate after changing to the new speed. Consequently, no shock nor wear is produced on the pinions nor is there any grinding noise as the gear is changed.

The invention is characterized by the combination with the driving and driven shafts of the gear box, or with members rotated thereby, of two tachometers driven respectively by the two aforementioned shafts, means being provided for varying the gear ratio between one of the aforesaid shafts and the corresponding tachometer, at the moment the speed is changed, under such conditions that the tachometers will register alike when the ratio of the angular velocities of the two shafts is equal to the speed ratio between direct drive and the desired speed, said tachometers thus constituting a means for determining the exact moment when the desired new speed must be engaged. The means for varying the gear ratio between one of the shafts and the corresponding tachometer consist of two friction discs, one mounted on the driving shaft for example, and the other on a square shaft while capable of being displaced longitudinally, so that by shifting the second disc, it can be rotated at different speeds the square shaft of said second disc driving the corresponding tachometer through the medium of any suitable means.

The invention is likewise concerned with means for not only indicating the exact moment when a speed should be engaged, but also for automatically engaging said speed.

According to an embodiment, said means consist of an electric circuit in which are mounted switches corresponding to each of the speeds to be engaged automatically, said circuit including furthermore a switch which is normally open but which is closed by suitable means when the two tachometers point to the same graduation. In practice, said circuit comprises as many circuits in parallel as there are speeds to be engaged automatically, each of said circuits corresponding to one of these speeds and including one of the above mentioned switches and a switch controlled by the tachometers. Said electric circuits include relays certain of which are energized immediately after the corresponding switch has closed, in order either to place the gear lever and consequently the gear box in neutral, or to displace the aforementioned friction disc, by any suitable means, while other relays are only energized after the tachometers have closed the additional switch, said relays then automatically shifting the gear lever to the position in which the speed corresponding to the circuit whose switch has been voluntarily closed is engaged in the gear box.

Means are provided for retaining the gear lever, and consequently the gear box, in any one of its possible positions, said means being controlled by the first relays mentioned above to release said lever at the desired moment.

According to an embodiment, enabling the electric circuit to be closed by the tachometers, the two needles of said tachometers are conductors and are connected to a relay actuating the additional switch and they move opposite contact studs arranged opposite graduations of the tachometers, each contact stud of one of said tachometers being connected electrically to the stud of the other tachometer located opposite the same graduation.

According to a constructional modification, the two tachometers are combined in one and the same apparatus, the two needles rotating about the same axis and carrying contact studs which come into contact when the two needles are superposed, that is to say, when they are opposite the same graduation.

The ordinary tachometer of the engine shaft and the speedometer generally provided on automobile vehicles may be used advantageously as tachometers.

Other characteristics and peculiarities of the invention will become apparent from the ensuing description taken in conjunction with the accompanying drawing in which:

Fig. 1 is a view in elevation of a device in accordance with the invention.

Fig. 1a illustrates very diagrammatically the electric circuit of said device.

Fig. 2 shows a constructional detail concerning the means for actuating one of the tachometers.

Fig. 3 is likewise a detail view concerning the gear lever.

Fig. 4 is a plan view corresponding to Fig. 3.

Fig. 5 shows a constructional modification of the two tachometers.

In the case illustrated, it is assumed that the device in accordance with the invention is to be applied to the gear box of the engine of an automobile vehicle, certain parts of which have been illustrated very diagrammatically such as the driving shaft 1, including in the usual manner a clutch 2, the gear box proper 3 and the driven shaft 4 for driving the back axle.

It has likewise been assumed that with this gear box it is only possible to obtain direct drive, two lower speeds respectively designated second and first speeds, and a reverse speed which, incidentally, is not actuated by the device according to the invention.

It has finally been assumed that the device only allows of automatically changing from first to second speed, from second to third (direct drive), and inversely from third to second, but does not allow of changing from second to first, an operation which is seldom resorted to. But it is obvious that all these assumptions have only been made for the sake of clearness in the ensuing description and it should be understood that the device according to the invention may be applied to all gear boxes and allows one to pass from any one speed to another.

This device broadly comprises a tachometer 5 driven by the driving shaft 1 through the medium of any suitable transmission, for example by means of a disc 6 which may frictionally rotate a second disc 7 perpendicular thereto and which is mounted so as to shift longitudinally on a square shaft 8 which drives a flexible cable 9 controlling the mechanism of the tachometer 5, which may be of course of any suitable construction.

The device likewise includes a second tachometer 10 which is controlled by the driven shaft 4 for example through the medium of a gear train 11a and a flexible cable 12a. Said tachometer 10 is always directly driven by the shaft 4, that is to say its needle 11 will always show the exact number of revolutions of the driven shaft 4.

On the contrary, the system of friction discs 6 and 7 driving the first tachometer 5 enables the transmission ratio between the driving shaft 1 and said tachometer to be varied.

In the position illustrated, said transmission ratio is equal to 1 for example, but as the disc 7 is brought nearer the shaft 1, the former will be driven at decreasing speeds, so that the needle 12 of the tachometer 5 will show a number of revolutions equal to the product of the exact number of revolutions by the transmission ratio.

It will be observed that with the gear box 3 in neutral, when it is desired to engage its gears to obtain a given speed, it is preferable from every point of view to wait, before effecting engagement, until the shafts 1 and 4 rotate at speeds the ratio of which is exactly equal to the ratio between direct drive and the desired speed.

Now, with the device in accordance with the invention, if the disc 7 be carefully brought into the position in which the transmission ratio between the shaft 1 and the tachometer 5 is exactly equal to the ratio between said two speeds, it is obvious that the two tachometers 5 and 10 will indicate the same number of revolutions at the precise moment at which the shafts 1 and 4 rotate at the desired speeds.

In order that this explanation may be more clearly understood, an example will be given. It will be assumed that the driving shaft 1 rotates normally at 1500 revs. per minute and that the gear box 3 is designed for direct drive, that is to say a speed of 1500 revs. of the driven shaft 4, a second speed in the ratio of $\frac{2}{3}$, that is to say 1000 revs. per minute of the driven shaft 4 and, finally, a third speed in the ratio of $\frac{1}{3}$ that is to say 500 revs. per minute of the shaft 4.

With the vehicle travelling in first, the shaft 1 rotates at 1500 revs. and the shaft 4 at 500. To engage second speed the gear box 3 is placed in neutral and the disc 7 is simultaneously brought in the position in which it is rotated at two-thirds the speed of the shaft 1, that is to say, the speed ratio; direct drive to second speed. The shaft 4 by its inertia continues to rotate at 500 revs. approximately. The accelerator is released, the engine speed drops and consequently that of the shaft 1. When the speed of the shaft 1 is 750 revs., the tachometer 5 will show $$750 \times 2/3 = 500,$$

that is to say exactly the same number as the tachometer 10 which has always indicated the number 500. Now, it is just at the moment when the shaft 1 reaches the speed of 750 revs. that the gear box 3 should be engaged in second for when said second speed is engaged, the two shafts will rotate in the ratio of $$\frac{750}{500} = 3/2.$$

Hence the two tachometers 5 and 10 form a very simple means for determining the moment at which the gear box 3, which has been previously placed in neutral, must be engaged for a predetermined speed. Hence, if at this moment the usual gear lever be shifted by hand, the desired speed may be engaged without shock, jar or noise and without it being necessary to declutch. Obviously, any warning signal may be combined with the tachometers, which will be actuated just at the moment when the indications of the tachometers are the same.

The invention likewise relates to particular means for automatically engaging the new speed at the desired moment. In the case illustrated, at the instant when they indicate the same number, the two tachometers 5 and 10 close an electric circuit which has been illustrated very diagrammatically and which in the particular case illustrated comprises two circuits 40 and 41 mounted in parallel as seen in Fig. 1ª. Opposite each graduation of each of the tachometers 5 and 10, is positioned a contact stud such as 13, the two studs of the two tachometers corresponding to the same number being connected together. The needles 11 and 12 are good conductors and are connected to a relay 14 which may close simultaneously the contacts 15 and 16 of the circuits 40 and 41. When the two needles 11 and 12 indicate different numbers, the contacts 15 and 16 are open. On the contrary, they are closed when the two needles 11 and 12 are opposite the same graduation.

In the respective circuits 40 and 41 are likewise mounted switches 17 and 18, mounted for example on the instrument board of the vehicle. The switch 17 will be closed by the driver when it is desired to pass from first or third to second speed, whereas the switch 18 will be closed when it is desired to pass from second to third speed. A certain number of suitable electromagnets or relays are mounted in parallel in the circuits 40 and 41.

The electros 19, 20 and 21 are energized simultaneously when the switch 17 is closed; the electro 23 is energized when the switch 18 is closed. The purpose of the electromagnets 19, 20, 21, 22, 23, 24 is to control the lever 25, which may be of any suitable known type, in a manner which will be presently described. Said lever 25 may for example be an oscillating lever which may either occupy the neutral position (illustrated in Figs. 3 and 4) or one of the four positions corresponding respectively to reverse and the three speeds obtainable.

In accordance with the invention, said lever is normally held in neutral by two compensating springs 26 and when it is brought into one of the other four positions, it is held there by spring actuated pawls 27 of any suitable known type and designed to be rendered automatically inoperative in both directions. In order to hold the lever 25, said pawls 27 cooperate with two noses 28 carried by said lever. There is of course a pawl 27 for each operative position of the lever 25 and said pawls have been designated respectively by 27$^{AR}$, 27$^1$, 27$^2$, 27$^3$. The electromagnets 19 and 20 can act respectively on the pawls 27$^1$ and 27$^3$ to render them inoperative. The electromagnet 22, when energized, can shift the lever 25 from neutral to the left to bring it into engagement with the corresponding pawl 27$^2$, that is to say into the position which, in the example illustrated, has been assumed to be that of second speed. The electromagnet 24 can shift the lever 25 to the right under the same conditions, that is to say bring it into third speed position. The electromagnet 23 controls the lefthand pawl 27$^2$ and finally the electromagnet 21 rocks a fork 29 which shifts the disc 7. The disc 7 is normally held by a spring 30 in the position in which it is rotated at the same speed as the shaft 1. When the electro 21 is energized, the fork 29 brings the plate 7 into the position in which it is rotated at a different speed under the conditions explained above.

The general operation of the device is as follows:

With the car running for example in second, the lever 25 is locked in the left position by the corresponding pawl 27$^2$. To change to third speed, the driver closes the switch 18. The electromagnet 23 is energized and withdraws the pawl 27$^2$ and under the action of the springs 26, the gear lever 25 returns to neutral. On the other hand, the electromagnet 24 has not been energized for the contact 16 has remained open. If the accelerator be now released, the engine speed drops and when the shaft 1 rotates at the same speed as the driven shaft 4 (no speed reduction between the shaft 1 and the tachometer 5 being introduced), the two tachometers 5 and 10 come opposite the same graduation and close the contact 16. The electro 24 is consequently excited and attracts the lever 25 to bring it into the righthand position corresponding to third speed. Hence the speed has been changed automatically, the driver only having had to press the button 18 and to manipulate the accelerator in the customary manner. One may drop from third to second speed under the same conditions. This is done by pressing on the button 17. The electro 20 will withdraw the pawl 27$^3$ and enable the lever 25 to return to neutral. Simultaneously the electro 21 will rock the fork 29 to bring the disc 7 into the desired position. When the relative speeds of rotation of the two shafts are such that the two tachometers are opposite the same graduation, the circuit will be closed, and the electro 22 will act on the lever 25 to shift it to second speed. The operation in passing from first to second speed is identical.

As has been previously stated, a device for changing from second to first speed has not been illustrated. It will only be necessary to provide a third contact similar to 17 and 18 mounted in a third shunt circuit, a second electromagnet 21 acting on the fork 29 to bring the disc 7 into a predetermined position in which it would be driven by the shaft 1 with the speed reduction corresponding to the ratio between direct drive and first speed. Moreover, more generally, the control device could be applied to all gear boxes whatever may be the number of gear ratios they provide.

Preferably, the usual gear lever will be retained. Said lever may fit removably on the lever 25 illustrated in Fig. 3.

In the preceding description, it has been assumed that the two tachometers 5 and 10 were tachometers specially provided for the purpose in view. But it is obvious that the usual tachometer of the engine shaft and the speedometer generally fitted on cars may be utilized. These members will merely require slight alterations. In certain cases they may be combined in one as illustrated in Fig. 5, in which the two needles 11 and 12 rotate about the same axis and close the circuit through contact studs 30 31 which they carry and which make contact with each other when the two needles are superposed, that is to say, when the two tachometers indicate the same number of revs.

In certain cases, the lever 25 might be displaced by means of mechanical, pressure or vacuum acting, relays which would then be actuated simultaneously by the driver and by the tachometers coming opposite the same graduations.

I claim:

1. An automatic change gear mechanism comprising in combination with the driving and driven shafts of a gear box, two tachometers, means for coupling said tachometers to the two aforementioned shafts respectively, means for varying the transmission ratio between one of the aforementioned shafts and the corresponding tachometer, when it is desired to change gear, in such manner that the two tachometers will register alike when the ratio of the speeds of the two shafts is equal to the ratio of their speeds in direct drive and in the gear desired.

2. An automatic change gear mechanism comprising in combination with the driving and driven shafts of a gear box, two tachometers, two friction plates, one mounted on said driving shaft, a lay shaft upon which the other friction disc is slidably mounted, said lay shaft being adapted to drive one of said tachometers, the other of said tachometers being driven by the driven shaft, and means for shifting the friction disc along said lay shaft so as to vary the transmission ratio between said driving shaft and its tachometer in such manner that said two tachometers will register alike when the ratio of the speeds of the driving and driven shafts is equal to the ratio of their speeds in direct drive and the gear desired.

3. An automatic change gear mechanism comprising in combination with the driving and driven shafts of a gear box, two tachometers, means for coupling said tachometers to the two aforementioned shafts respectively, means for varying the transmission ratio between one of the aforementioned shafts and the corresponding tachometer, when it is desired to change gear, in such manner that the two tachometers will register alike when the ratio of the speeds of the two shafts is equal to the ratio of their speeds in direct drive and in the gear desired, and means for automatically effecting the gear change desired.

4. An automatic change gear mechanism comprising in combination with the driving and driven shafts of a gear box, two tachometers, two friction plates, one mounted on said driving shaft, a lay shaft upon which the other friction disc is slidably mounted, said lay shaft being adapted to drive one of said tachometers, the other of said tachometers being driven by the driven shaft, means for shifting the friction disc along said lay shaft so as to vary the transmission ratio between said driving shaft and its tachometer in such manner that said two tachometers will register alike when the ratio of the speeds of the driving and driven shafts is equal to the ratio of their speeds in direct drive and the gear desired, an electric circuit including a shunt circuit adapted to be closed through the needles of said tachometer when they register alike, means energized by said shunt circuit for closing said main circuit, electromagnetic means energized by the closing of said main circuit, and a lever controlling the gear box and adapted to be actuated by said electromagnetic means when energized to change gear.

5. An automatic change gear mechanism according to claim 2, in which the means for shifting the friction disc along the lay shaft comprise a solenoid, means for energizing said solenoid, and a forked member adapted to be operated by said solenoid to shift said friction disc.

6. An automatic change gear mechanism comprising in combination with the driving and driven shafts of a gear box, two tachometers, two friction discs, one mounted on said driving shaft, a lay shaft upon which the other friction disc is slidably mounted, said lay shaft being adapted to drive one of said tachometers, the other of said tachometers being driven by the driven shaft, means for shifting the friction disc along said lay shaft so as to vary the transmission ratio between said driving shaft and its tachometer in such manner that said two tachometers will register alike when the ratio of the speeds of the driving and driven shafts is equal to the ratio of their speeds in direct drive and the gear desired, a gear lever, an electric circuit, relays mounted in said circuit and adapted, when energized, to place said gear lever in neutral, additional relays mounted in said circuit for shifting said gear lever from neutral into the respective gears, and conducting needles fitted to said tachometers and adapted when registering alike to close a circuit for said additional relays.

7. An automatic change gear mechanism according to claim 6 in combination with means controlled respectively by certain of said first mentioned relays for locking said gear lever in its respective gear engaging positions, said locking means when actuated by the corresponding relay releasing said gear lever, and means tending to hold said gear lever in neutral.

RENÉ EDMOND BOUTET.